Patented May 31, 1949

2,471,830

UNITED STATES PATENT OFFICE 2,471,830

HYDROCARBONOXY(TRIFLUOROMETHYL)-BENZENE SYNTHESIS

Earl T. McBee, La Fayette, Ind., Robert O. Bolt, Richmond, Calif., and Robert Tebbe, Orono, Maine, assignors to Purdue Research Foundation, La Fayette, Ind., a corporation of Indiana No Drawing. Application August 30, 1946, Serial No. 694,154

23 Claims. (Cl. 260—612)

This invention relates to a process for the preparation of compounds designated as hydrocarbonoxy(trifluoromethyl)benzenes. The term "hydrocarbonoxy" is used throughout this application to designate hydrocarbon ether radicals of the formula R—O—, wherein R is any hydrocarbon radical. A metal salt of such a radical is appropriately referred to as a metallic "hydrocarbonoxide." The compounds produced by the present invention may also be referred to as "ethers of trifluoromethyl-substituted phenols."

It is an object of the present invention to provide a process for the preparation of hydrocarbonoxy(trifluoromethyl)benzenes, including mono-, bis-, and tris(trifluoromethyl)benzenes. An additional object of our invention is to provide a method for the preparation of hydrocarbonoxy-(trifluoromethyl)benzenes by the reaction of a halogenated (trifluoromethyl)benzene and an alkali metal hydrocarbonoxide. A further object of our invention is to provide a method for the preparation of hydrocarbonoxy(trifluoromethyl)-benzenes which allows high yields of the desired product and which may be conducted at moderately elevated temperatures. Other objects of the invention will become apparent from the following specification and claims.

We have accomplished the foregoing and additional objects of our invention and have prepared hydrocarbonoxy(trifluoromethyl)benzenes by the reaction of a halogenated, i. e., ring-brominated, -fluorinated, -iodinated or -chlorinated (trifluoromethyl)benzene with an alkali metal hydrocarbonoxide. Preferably we conduct the reaction in a suitable organic solvent. We have found it advantageous to employ an anhydrous organic solvent, e. g., an anhydrous alcoholic medium, inasmuch as, in some cases, the presence of water in the reaction mixture tends to produce hydrolysis, and thereby lower the yield of the desired reaction product. We have found that, in some instances, it may not be necessary to employ the anhydrous alkali metal hydrocarbonoxide as the starting material, as it is possible to bring about the desired reaction between the halogenated (trifluoromethyl)benzene and the selected alcohol and the alkali metal hydroxide in an alcoholic medium.

In conducting our reaction, we may select starting materials which will permit the preparation of any particular one of the series of hydrocarbonoxy(trifluoromethyl)benzenes. For example, we may treat 4-chloro(trifluoromethyl)benzene with anhydrous sodium methoxide in a methanol solvent, thereby producing 4-methoxy(trifluoromethyl)benzene. As another example, we may treat 4-chloro-1,3-bis(trifluoromethyl)benzene with sodium isopropoxide in an isopropanol medium, thereby producing high yields of 4-isopropoxy-1,3-bis(trifluoromethyl)benzene. Many other applications of our new process will be immediately apparent, and the examples hereinafter will serve to illustrate the broad utility of our invention.

By the method of this new process, the preparation of hydrocarbonoxy(trifluoromethyl)benzenes may be accomplished by reacting the aforementioned starting materials, i. e., a halogenated (trifluoromethyl)benzene and an alkali metal hydrocarbonoxide, preferably in a suitable anhydrous organic medium. The reaction container is preferably a steel autoclave fitted with a heater and a mechanical rocking device, but any other suitable container may be employed wherein the reaction temperature may be maintained at about 175 degrees centigrade. The type of reaction vessel in no way limits the invention, as many different reaction containers have been employed for conducting our new process, and all types have been found satisfactory. It is, however, advantageous to provide a satisfactory means of agitation of the reaction mixture, inasmuch as the efficiency of the process is to some extent dependent upon solubilities of the reactants, and agitation thus promotes higher yields of the desired product. Some of the compounds of the hydrocarbonoxy(trifluoromethyl)benzene series may be more easily prepared than others, due to the varying solubilities and reactivities of the respective alkali metal hydrocarbonoxides and halogenated (trifluoromethyl)benzene and the reaction conditions may be varied accordingly.

Our new reaction is advantageously conducted between about 40 and about 225 degrees centigrade, and the preferred temperature range is between about 60 and 175 degrees centigrade. As before stated, the varying solubilities and reactivities of the reactants employed for the production of any specific hydrocarbonoxy(trifluoromethyl)benzene will indicate the desirability of a higher or lower temperature for the reaction, as well as the desirability of any particular mode of operation of our new process. Optimum yields of reaction product are usually produced within the preferred temperature range of about 60 to 175 degrees centigrade.

After the reaction is complete, the product may be washed with dilute hydrochloric acid to neutralize any excess alkali metal hydrocarbonoxide, the organic layer may be separated and washed with water, and any aqueous layers may be extracted with chloroform or other suitable solvent. The extracts and the organic layer may then be combined, dried and rectified to yield the desired hydrocarbonoxy(trifluoromethyl)benzene. Other methods of separation may be used, and will be apparent to one skilled in the art.

The halogenated (trifluoromethyl)benzene employed in the process may be selected from the ring-brominated, iodinated, chlorinated or fluorinated compounds. For ease of handling and maximum reaction efficiency, the employment of a chlorinated (trifluoromethyl)benzene proves most effective, but the iodinated, brominated, and fluorinated compounds are otherwise satisfactory. The alkali metal hydrocarbonoxide employed may be the sodium or potassium compound, and although the sodium hydrocarbonoxide was in most cases employed, for those reactions where additional reactivity was desirable, the potassium hydrocarbonoxide was advantageously utilized. The organic medium for the reaction is preferably an anhydrous polar solvent, especially an anhydrous alcohol, as maximum efficiency and yield of desired product is thus obtained. A preferred mode of conducting the reaction involves the use of a hydrocarbonoxide of the formula R—OX, wherein X is an alkali metal, and an alcoholic medium represented by R—OH, R in both of the above formulas representing the same hydrocarbon radical.

In conducting the reaction, mole ratios of alkali metal hydrocarbonoxide and halogenated (trifluoromethyl)benzene of 2.5 to 3 are most satisfactory. The use of greater ratios did not increase the yield of product materially, while a less than two to one ratio, although operative, resulted in less than optimum yields. Similarly, when the halogenated (trifluoromethyl)benzene is treated with an alcohol and an alkali metal hydroxide instead of the anhydrous alkali metal hydrocarbonoxide, the same metallic compound-benzene derivative ratio of 2.5 or 3 to 1 is desirable. The use of an additional excess of the alcohol is advisable, inasmuch as this allows a more fluid reaction medium.

If the solid alkali metal hydrocarbonoxide is relatively insoluble in the corresponding alcohol, such as is the case with sodium cyclohexoxide in cyclohexanol, the solid alkali metal hydrocarbonoxide may be advantageously ground and suspended in a mixture of dioxan and cyclohexanol, and the halogenated (trifluoromethyl)-benzene added thereto. The medium employed for the reaction is ordinarily an organic solvent, preferably a polar solvent. It is also preferable that the solvent be anhydrous inasmuch as higher yields are obtained when no hydrolysis of product occurs. Representative solvents which may be mentioned include alcohols, acetone, dioxan, 3,6,9-trioxahendecane, and the like.

The following examples illustrate several ways in which the principle of our invention may be applied, but are in no way to be construed as limiting the invention thereto.

*Example 1*

In each of three separate experiments, four moles of 4-chloro-(trifluoromethyl)benzene (prepared by the HF-SbCl$_5$ fluorination of 4-chloro-1-(trichloromethyl)benzene, twelve moles of anhydrous sodium methoxide and 650 milliliters of methanol solvent were placed in a steel autoclave of two-liter capacity. The autoclave was fitted into a heater having a mechanical rocking device, whereby the temperature of the reaction mixture was raised over a three-hour period to between 170 and 175 degrees centigrade with constant rocking. This temperature was maintained for a period of five hours, after which the autoclave was allowed to cool slowly. The reaction products from the various experiments were then combined and excess sodium methoxide was neutralized with dilute hydrochloric acid. The organic layer which separated was then washed with water, and the combined aqueous layers were extracted with chloroform. The organic layer was added to the chloroform extract and the resulting solution was dried and rectified. Methanol, chloroform, and most of the unreacted 4-chloro-(trifluoromethyl)benzene which remained were stripped off at atmospheric pressure and the remaining liquid was rectified at 39-40 millimeters of mercury pressure absolute. 4-methoxy-1-(trifluoromethyl)benzene, boiling between 81 and 83 degrees centigrade at this pressure, was collected. A 46.1 per cent conversion and a 79.2 per cent yield were obtained.

*Example 2*

In each of three separate experiments, four moles of 2-chloro-(trifluoromethyl)benzene (prepared by the method given above for 4-chloro-1-(trifluoromethyl)benzene), twelve moles of anhydrous sodium methoxide, and 590 milliliters of methanol solvent were placed in a nickel-lined autoclave of two-liters capacity. The vessel, which was fitted with a mechanical stirrer, was heated to 170-180 degrees centigrade over a period of three hours and thereafter was maintained at this temperature for about five hours. At the end of this time the autoclave was allowed to cool slowly. Reaction products of the three experiments were then combined and treated in the same manner as described in Example 1. After methanol, chloroform and some unreacted 2-chloro-(trifluoromethyl)benzene had been stripped from the reaction product at atmospheric pressure, a solid (a mixture of 2-methoxybenzoic acid and 2-hydroxybenzoic acid), formed in the still pot, and some evolution of a hydrogen halide was evident. The rectification was stopped and the solid was removed by filtration. The filtrate was extracted with dilute sodium hydroxide solution and washed with water before being dried. Rectification of the resulting material at 39-40 milliliters of mercury pressure absolute yielded the desired 2-methoxy-(trifluoromethyl)benzene. A 24 per cent conversion and 41 per cent yield of the ether, boiling at 87-88 degrees centigrade at this pressure were obtained.

*Example 3*

One mole of 3-chloro(trifluoromethyl)benzene, three moles of sodium hydroxide and 200 milliliters of methyl alcohol were heated with constant rocking in a one-liter iron autoclave at a temperature of 160 degrees centigrade over a four-hour period. After cooling, the contents of the autoclave was acidified. The resulting organic layer was separated and aqueous layers were extracted with chloroform. The organic layer and extracts were combined, washed, dried, and rectified to recover 3-methoxy(trifluoromethyl)benzene, boiling at 159–159.5 degrees centigrade at 741 millimeters of mercury pressure absolute. This ether fraction had a fluorine content of 33.2 per cent as compared to theoretical value of 32.3 per cent for 3-methoxy(trifluoromethyl)benzene. Conversion and yield were 12.5 and 29.5 per cent, respectively.

*Example 4*

In the same manner as in Example 3, 3-chloro(trifluoromethyl)benzene, sodium hydroxide, and ethyl alcohol were heated with constant rocking in a one-liter iron autoclave at a temperature of about 160 degrees centigrade over a four-hour period. The autoclave was allowed to cool and the product was treated as described in Example 3. Rectification yielded 3-ethoxy(trifluoro-methyl) benzene, boiling at 173 degrees centigrade at 741 millimeters of mercury pressure absolute, containing 30.2 per cent fluorine as compared with the theoretical of 30.0 per cent, and having an observed molecular weight of 193 as compared to the theoretical value of 190.

In a similar manner the ortho-, meta- and parapropoxy-, isopropoxy-, n-octoxy-, cyclohexoxy-, benzyloxy-, phenoxy-, and similar hydrocarbonoxy(trifluoromethyl)benzenes may be prepared by substitution of the desired alcohol or alcoholate for those used in the preceding examples. (Trifluoromethyl)benzenes containing two substituent halogen atoms may be treated in a like manner to prepare dihydrocarbonoxy(trifluoromethyl)benzenes.

*Example 5*

The purification of meta-xylene according to a procedure outlined by Clarke and Taylor (J. Am. Chem. Soc., 45, 830–833 (1923) was accomplished in the following manner: Isomeric xylenes were removed from technical meta-xylene by boiling with dilute nitric acid; the unoxidized product was sulfonated to form xylene-sulfonic acid; and pure meta-xylene was separated therefrom by steam distillation. Pure meta-xylene, boiling at 138 to 139 degrees centigrade at atmospheric pressure, was obtained.

One hundred six grams (1 mole) of pure meta-xylene was treated with 73 grams of gaseous chlorine in the liquid phase in the presence of 1 gram of ferric chloride catalyst. The temperature was maintained between about 40 and 50 degrees centigrade during the reaction. The product resulting from this chlorination was rectified and the fraction boiling at about 89 degrees centigrade at 24 millimeters of mercury pressure absolute was collected. Thus was produced 123 grams of 4-chloro-meta-xylene (87 per cent yield and conversion). Proof of structure of this compound was obtained by oxidation with dichromate solution to 4-chloro-meta-toluic acid, melting at 202 to 204 degrees centigrade.

One hundred twenty-three grams of 4-chloro-meta-xylene, prepared as described, was photochemically chlorinated with gaseous chlorine. The liquid was placed in a vertical, 68 millimeter, glass clorination tube illuminated with six 200-watt incandescent light bulbs, and gaseous chlorine was continuously passed into the reaction mixture through a gas dispersion disc over a period of forty-eight hours. During this time the temperature was allowed to rise gradually from about 30 to about 150 degrees centigrade and was controlled by means of an internally placed water-cooled coil and resistance wire wound around the lower part of the tube. When reaction was complete, the product was aerated prior to purification by vacuum distillation. Three hundred and two grams of substantially pure 4 - chloro-1,3-bis(trichloromethyl)benzene, boiling at 170 to 180 degrees centigrade at 6 millimeters of mercury pressure absolute, representing a 97.8 per cent yield and conversion, was obtained.

The substitution of fluorine for chlorine in the side chains was accomplished in the following manner: Three hundred and two grams of 4-chloro-1,3-bis(trichloromethyl)benzene and 20 grams of antimony pentachloride were placed in a two-gallon nickel autoclave and hydrogen fluoride was allowed to pass into the mixture for about forty-eight hours, 380 grams of hydrogen fluoride being introduced during that period at a temperature of about 70 to 80 degrees centigrade. The reaction product, after purification by steam distillation and rectification, weighed 137.9 grams, representing a conversion and yield of 4-chloro-1,3-bis(trifluoromethyl)benzene of 88 per cent. An unreacted residue of 95 grams was recycled to yield an additional quantity of desired product.

A mixture of two hundred and forty-eight grams of 4-chloro-1,3-bis(trifluoromethyl)benzene, fifty-four grams of anhydrous sodium methoxide, and three hundred milliliters of methanol was refluxed for twelve hours. The alcoholic solution was diluted with a large volume of water to cause the liquid reaction product to separate into two layers. The organic layer was separated and washed several times with dilute sulfuric acid and with water prior to being dried over calcium chloride. Rectification yielded a fraction boiling at 86–86.5 degrees centigrade at 27 millimeters of mercury pressure absolute. Molecular weight determination and fluorine analysis proved the compound to be 4-methoxy-1,3-bis(trifluoromethyl)benzene.

*Example 6*

4-ethoxy-1,3-bis(trifluoromethyl)benzene was produced by the substitution of sodium ethoxide for sodium methoxide and ethyl alcohol for methyl alcohol in the procedure outlined in Example 5.

*Example 7* n-Propyl alcohol, 4-chloro-1,3-bis(trifluoromethyl)benzene and sodium propoxide were placed in an autoclave. This vessel was fitted into a heater in a mechanical rocker and heated to 160 degrees centigrade over a period of about 4 hours. At the end of this time the autoclave was allowed to cool and the reaction product was poured into dilute acid, whereupon an organic layer separated. The aqueous layer was extracted with chloroform and the extracts were added to the organic layer. The combined organic product was washed with water, dried over anhydrous calcium sulfate and rectified to yield 4-n-propoxy-1,3-bis(trifluoromethyl)benzene. In this case it was found advantageous to prepare the sodium alcoholate under anhydrous conditions by a reaction between the alcohol and metallic sodium, inasmuch as a certain amount of hydrolysis was found to occur during the reaction if substantially anhydrous conditions were not employed.

Example 8

In a manner similar to the above, 4-isopropoxy-1,3-bis(trifluoromethyl)benzene was prepared from a mixture of 4-chloro-1,3-bis(trifluoromethyl)benzene and sodium isopropoxide in an isopropanol medium, by heating the mixture to 160 degrees centigrade over a period of about 4 hours in an autoclave fitted into a mechanical rocker. After cooling, the reaction mixture was elutriated with dilute acid and the organic layer was separated by pouring into water. Chloroform was used to extract the aqueous layers, and the extracts were combined with the organic product. After washing and drying over anhydrous calcium sulfate, the combined product was rectified, yielding 4-isopropoxy-1,3-bis(trifluoromethyl)-benzene.

Example 9

One hundred grams of 4-chloro-1,3-bis(trifluoromethyl)benzene and 156 grams of sodium benzyloxide were dissolved in a large excess of benzyl alcohol and refluxed for eight hours. The reaction mixture was then cooled, poured into water containing sufficient sulfuric acid to make the resulting mixture acid to litmus, and the organic layer was separated therefrom. Chloroform extracts of the wash water were combined with the organic layer. This solution was dried over anhydrous calcium sulfate and vacuum rectified. A 48.3 per cent yield and conversion of 4-benzyloxy-1,3-bis(trifluoromethyl)benzene was obtained.

Example 10

Three hundred grams of sodium cyclohexoxide, suspended in a mixture of 400 milliliters of dioxan and 200 milliliters of cyclohexanol, was admixed with 186 grams of 4-chloro-1,3-bis(trifluoromethyl)benzene in an autoclave of one-liter capacity fitted into a rocker. Over a period of five hours the temperature was raised to 160 degrees centigrade and allowed to return to room temperature. The reaction mixture was poured into a dilute sulfuric acid solution and the organic layer was separated and washed. Wash waters were extracted with benzene and the extracts were combined with the organic product. Rectification yielded 4-cyclohexoxy-1,3-bis(trifluoromethyl)benzene.

Example 11

A mixture of 208 grams of n-octyl alcohol, 500 milliliters of dioxan, and 32 grams of sodium was refluxed until reaction ceased. The resulting suspension of sodium octoxide in dioxan was transferred to a one-liter iron autoclave and 186 grams of 4-chloro-1,3-bis(trifluoromethyl)benzene was added thereto. The mixture was heated to 160 degrees centigrade over a period of about six hours and then cooled slowly, the reaction product being recovered by pouring the mixture into dilute sulfuric acid and separating the organic layer. This layer was washed with water and all of the aqueous layers extracted with chloroform. The extracts were mixed with the original organic layer and the mixture was dried over anhydrous calcium sulfate. Rectification yielded 127 grams of 4-n-octoxy-1,3-bis(trifluoromethyl)-benzene, boiling at 135–137 degrees centigrade at 6 millimeters of mercury pressure absolute. This product corresponds to a 48.8 per cent conversion and yield of the desired ether.

Example 12

Eighty-one grams of 2-chloro-1,4-bis(trifluoromethyl)benzene, prepared in a manner analogous to the chlorination and fluorination procedures outlined in Example 5, 300 milliliters of methanol, and 42 grams of sodium hydroxide were placed in an iron autoclave and maintained at a temperature of 160 degrees centigrade over a period of about six hours with constant rocking. A conversion of 8.75 per cent and a yield of 19.2 per cent of 2-methoxy-1,3-bis(trifluoromethyl)benzene was obtained from the reaction product.

Example 13

One hundred and twelve grams of 5-chloro-1,3-bis(trifluoromethyl)benzene (prepared by the chlorination of 1,3-bis(trifluoromethyl)benzene), 68 grams of sodium ethoxide and 400 milliliters of absolute ethanol were placed in a one-liter iron autoclave, heated at 165 degrees centigrade for about six hours with constant rocking, and allowed to cool to room temperature. The products of the reaction were poured into dilute sulfuric acid and the organic layer separated. This layer was washed with water several times, wash solutions being extracted with benzene and the extracts being combined with the organic layer prior to drying over anhydrous calcium sulfate and rectifying. A 67.9 per cent conversion and yield of 5-ethoxy-1,3-bis(trifluoromethyl)benzene, boiling between 81 and 82 degrees centigrade at 29 millimeters of mercury pressure absolute, was obtained.

Example 14

Eighty-nine grams of 5-chloro-1,3-bis(trifluoromethyl)benzene, 300 milliliters of methanol and 44 grams of sodium methoxide were treated as in Example 13 at a reaction temperature of 180 degrees centigrade, 30.5 grams of the unreacted chloro compound and 42 grams of the ether resulting. The conversion was 48 per cent and the yield of the desired 5-methoxy-1,3-bis(trifluoromethyl)benzene was 76 per cent.

Example 15

Two hundred grams of sodium phenate, 186 grams of 4-chloro-1,3-bis(trifluoromethyl)benzene, 400 grams of phenol and 1 gram of powdered copper were sealed in an autoclave of one-liter capacity which was mounted in a rocker. The temperature was raised to 225 degrees centigrade over a period of six hours. After cooling, the reaction mixture was poured into excess sodium hydroxide solution and steam-distilled. The organic product was separated, washed, dried over anhydrous sodium sulfate, and rectified under vacuum. Ether extracts of the wash solutions were combined with the product prior to rectification. The yield was 76 grams of 4-phenoxy-1,3-bis(trifluoromethyl)benzene, boiling at 121 to 122 degrees centrigrade at 14 millimeters of mercury pressure absolute.

Example 16

2-chloro-1,3-bis(trifluoromethyl)benzene (prepared from 2-chloro-1,3-dimethylbenzene in a manner analogous to that given in Example 5) was treated with sodium methoxide in the presence of excess methanol to yield 2-methoxy-1,3-bis(trifluoromethyl)benzene. The procedure used was the same as that described for the preparation of 4-methoxy-1,3-bis(trifluoromethyl)benzene.

The following table indicates physical constants of some hydrocarbonoxy(trifluoromethyl)-benzenes, prepared as described in the preceding examples, and their intermediates:

glass-packed column of 14 millimeters diameter. Data obtained from these reactions establishes the order of reactivity for the halogenated mono-

| Compound | B. P.,[1][2] °C. (754 mm.) | M. P.,[2] °C. | $n^{D20}$ | Analyses | |
|---|---|---|---|---|---|
| | | | | Theoretical per cent F | Observed Per cent F |
| 2-$CF_3C_6H_4OCH_3$ | 173.7 | −14.1 to −14.3 | 1.4524 | 32.4 | 33.0 |
| 2-$CF_3C_6H_4OC_2H_5$ | 184.5 | −2.4 to −2.8 | 1.4470 | 30.0 | 30.6 |
| 2-$CF_3C_6H_4OCH(CH_3)_2$ | 202.9 | −29.7 to −30.3 | 1.4488 | 27.9 | 28.2 |
| 3-$CF_3C_6H_4OCH_3$ | 159.5 | −65.0 | 1.4435 | 32.5 | 33.4 |
| 3-$CF_3C_6H_4OC_2H_5$ | 173.0 | −16.0 | 1.4428 | 30.0 | 30.2 |
| 4-$CF_3C_6H_4OCH_3$ | 168.5 | −9.1 | 1.4455 | 32.4 | 33.3 |
| 4-$CF_3C_6H_4OC_2H_5$ | 182.7 | 9.3 | 1.4451 | 30.0 | 30.6 |
| 4-$CF_3C_6H_4OCH(CH_3)_2$ | 200.0 | 3.0 | 1.4458 | 27.9 | 28.8 |
| 1,3-$(CF_3)_2C_6H_3$-4-$OCH_3$ | 176.0 | 17.5 to 18.0 | 1.4149 | 46.8 | 47.2 |
| 1,3-$(CF_3)_2C_6H_3$-4-$OC_2H_5$ | 185.0 | 26.0 to 26.5 | 1.4130 | 44.2 | 44.6 |
| 1,3-$(CF_3)_2C_6H_3$-4-$OC_3H_7$ | 200.0 | −15.0 to −16.0 | 1.4162 | 42.0 | 41.8 |
| 1,3-$(CF_3)_2C_6H_3$-4-$OCH(CH_3)_2$ | 192.0 | Sets to a glass | 1.4128 | 42.0 | 41.9 |
| 1,3-$(CF_3)_2C_6H_3$-4-$OC_6H_{11}$ | 255 | | 1.4523 | 36.5 | 34.4 |
| 1,3-$(CF_3)_2C_6H_3$-4-$OCH_2C_6H_5$ | 275.0 277.0 | Sets to a glass | 1.4887 | 35.6 | 34.6 |
| 1,3-$(CF_3)_2C_6H_3$-4-$OC_8H_{17}$ | 278.0 | −8.5 to −9.5 | 1.4304 | 33.3 | 33.5 |
| 1,3-$(CF_3)_2C_6H_3$-4-$OC_6H_5$ | 244.0 | Sets to a glass | 1.4756 | 37.3 | 38.2 |
| 1,3-$(CF_3)_2C_6H_3$-5-$OCH_3$ | 160.0 | 2.0 to 3.0 | 1.4084 | 46.8 | 47.5 |
| 1,3-$(CF_3)_2C_6H_3$-2-$OCH_3$ | 173.0 | 4.0 to 5.0 | 1.4170 | 46.8 | 47.5 |
| 1,4-$(CF_3)_2C_6H_3$-2-$OCH_3$ | 163.0 | 26.5 to 27.5 | 1.4221 | 46.8 | 46.9 |
| 1,3-$(CF_3)_2C_6H_3$-4-Cl | 148.0 | −58.0 to −59.0 | 1.4150 | 45.8 | [3] 45.9 |
| 1,3-$(CF_3)_2C_6H_3$-5-Cl | 137.5 | −29.5 to −30.0 | 1.3611 | 45.8 | [4] 45.6 |
| 1,4-$(CF_3)_2C_6H_3$-2-Cl | 147.0 | −12.0 to −13.0 | 1.4135 | 45.8 | [5] 46.1 |

[1] Determined by Siwoloboff micromethod (Shriner and Fuson, "Identification of Organic Compounds," 2nd ed. p. 93 (1940)).
[2] Absolute values accurate to ±0.2° C.
[3] 14.3% Cl calculated, 14.5% found.
[4] 14.3% Cl calculated, 14.1% found.
[5] 14.3% Cl calculated, 14.7% found.

It will be apparent from the foregoing that any of the aforementioned alkali metal hydrocarbonoxides may be treated with the properly selected halogenated (trifluoromethyl)benzene to produce the corresponding hydrocarbonoxy(trifluoromethyl)benzene. In a similar manner, hydrocarbonoxy - tris(trifluoromethyl)benzenes may be obtained from a reaction between halogenated tris(trifluoromethyl)benzenes and an alkali metal hydrocarbonoxide, and dihydrocarbonoxy(trifluoromethyl)benzenes may be obtained by a reaction of a dihalogenated (trifluoromethyl)benzene and the selected alkali metal hydrocarbonoxide.

*Example 17*

One hundred and forty-six grams (0.566 mole) of 4-chloro-1,3-bis(trifluoromethyl)benzene was treated with a solution of potassium hydroxide (37 grams, 0.67 mole) in 250 milliliters of methanol. Fifty grams (0.22 mole) of 4-methoxy-1,3-bis(trifluoromethyl)benzene was recovered from the reaction product, representing a conversion of 52.5 per cent and a yield of 89.4 per cent. The reaction was conducted at the reflux temperature of the mixture for a period of about three hours.

*Example 18*

To determine the reactivity of certain chloro- and bromomono(trifluoromethyl)benzenes toward sodium methoxide in methanol, a series of reactions was performed at 160 degrees centigrade in an iron autoclave of one liter capacity. In each case 3.0 moles of sodium methoxide, 1.0 mole of halogenated (trifluoromethyl)benzene, and 200 milliliters of methanol were used. The autoclave was heated with rocking to 160 degrees centigrade over a period of four hours. The cooled mixture was washed from the autoclave with water, acidified with hydrochloric acid, and steam-distilled. The organic phase of the steam-distillate was combined with chloroform extract of the aqueous phase and dried over sodium sulfate. Rectification was performed in a four-foot (trifluoromethyl)benzenes. The 4 - chloro(trifluoromethyl)benzene appears most reactive and the 3-chloro(trifluoromethyl)benzene appears the least reactive. The 3-bromo(trifluoromethyl)-benzene appeared still less reactive, producing a yield of 31.2 per cent and a conversion of 23.3 per cent, as compared to a yield of 75.2 and a conversion of 56.8 per cent obtained from the 4-chloro(trifluoromethyl)benzene. (The bromo derivative used herein was prepared by the bromination of trifluoromethylbenzene with the aid of a ferric chloride catalyst at 60 degrees centigrade.)

Many different procedural variations may be utilized in carrying out the method of the present invention. These procedures differ only in temperature, pressure, exposure time, and amount of water present. The position of the halogen of the benzene nucleus which is to be replaced and the complexity of the carbon chain of the hydrocarbonoxide determine the desirable procedure. These factors determine the threshold temperature required for a finite reaction rate and determine the amount of hydrolysis product. Once the threshold has been attained, the chosen procedure is the one involving the temperature which produces a convenient reaction rate, and hence also optimum yield of desired product. Among the many modes of operation, the following may be mentioned as of particular advantage:

Procedure 1 involves reflux of the halogenated (trifluoromethyl)benzene and the alkali metal hydrocarbonoxide in an alcoholic medium. Procedure 2 is identical with 1, but 3,6,9-trioxahendecane is used in place of the alcohol. In procedure 3, a mixture of an alkali metal hydroxide and a selected alcohol may be used in place of the metallic hydrocarbonoxide. Procedures 4 and 5 correspond to procedures 1 and 3, respectively, except that an autoclave is used as reaction container, the reaction being conducted under pressure. As many other variations are possible without departing from the spirit or scope of the invention and will be immediately apparent to one skilled in the art, it will be understood that we limit ourselves only as defined in the appended claims.

The present application is a continuation-in-part of our prior filed copending application Serial 639,906 filed January 8, 1946.

We claim:

1. The process which includes: reacting a (trifluoromethyl)-halobenzene, halogen and trifluoromethyl being the only substituents on the benzene ring, and an alkali metal hydrocarbonoxide selected from the class consisting of alkoxides, cycloalkoxides, monocyclic aralkoxides, and monocyclic aryloxides at a temperature between about 40 and about 225 degrees centigrade and separating from the reaction product a hydrocarbonoxy(trifluoromethyl)benzene.

2. The process which includes: reacting a (trifluoromethyl)-halobenzene, halogen and trifluoromethyl being the only substituents on the benzene ring, and an alkali metal hydrocarbonoxide selected from the class consisting of alkoxides, cycloalkoxides, monocyclic aralkoxides, and monocyclic aryloxides in an organic solvent at a temperature between about 40 and about 225 degrees centigrade and separating from the reaction product a hydrocarbonoxy(trifluoromethyl)benzene.

3. The process which includes: reacting a (trifluoromethyl)-halobenzene, halogen and trifluoromethyl being the only substituents on the benzene ring, and an alkali metal hydrocarbonoxide selected from the class consisting of alkoxides, cycloalkoxides, monocyclic aralkoxides, and monocyclic aryloxides in an anhydrous organic solvent at a temperature between about 40 and about 225 degrees centigrade and separating from the reaction product a hydrocarbonoxy(trifluoromethyl)benzene.

4. The process which includes: reacting a (trifluoromethyl)-halobenzene, halogen and trifluoromethyl being the only substituents on the benzene ring, and an alkali metal hydrocarbonoxide selected from the class consisting of alkoxides, cycloalkoxides, monocyclic aralkoxides, and monocyclic aryloxides in an anhydrous alcoholic medium at a temperature between about 40 and about 225 degrees centigrade and separating from the reaction product a hydrocarbonoxy(trifluoromethyl)benzene.

5. The process which includes: reacting a (trifluoromethyl)-halobenzene, halogen and trifluoromethyl being the only substituents on the benzene ring, and an alcohol selected from the class consisting of alkanols, cycloalkanols, monocyclic aralkyl alcohols, and monocyclic phenols in an alcoholic medium containing an alkali metal hydroxide as a component at a temperature between about 40 and about 225 degrees centigrade and separating from the reaction product a hydrocarbonoxy(trifluoromethyl)benzene.

6. The process which includes: reacting a (trifluoromethyl)-halobenzene, halogen and trifluoromethyl being the only substituents on the benzene ring, and an alcohol selected from the class consisting of alkanols, cycloalkanols, monocyclic aralkyl alcohols, and monocyclic phenols in an anhydrous alcoholic medium containing an alkali metal hydroxide as a component at a temperature between about 40 and about 225 degrees centigrade and separating from the reaction product a hydrocarbonoxy(trifluoromethyl)benzene.

7. The process as claimed in claim 1 wherein the reaction temperature is maintained between about 60 and about 175 degrees centigrade.

8. The process which includes: reacting a (trifluoromethyl)-chlorobenzene, halogen and trifluoromethyl being the only substituents on the benzene ring, and an alkali metal hydrocarbonoxide selected from the class consisting of alkoxides, cycloalkoxides, monocyclic aralkoxides, and monocyclic aryloxides at a temperature between about 40 and about 225 degrees centigrade and separating from the reaction product a hydrocarbonoxy(trifluoromethyl)benzene.

9. The process which includes: reacting a (trifluoromethyl)-chlorobenzene, halogen and trifluoromethyl being the only substituents on the benzene ring, and an alkali metal hydrocarbonoxide selected from the class consisting of alkoxides, cycloalkoxides, monocyclic aralkoxides, and monocyclic aryloxides in an alcoholic medium at a temperature between about 40 and about 225 degrees centigrade and separating from the reaction product a hydrocarbonoxy(trifluoromethyl)benzene.

10. The process which includes: reacting a (trifluoromethyl)-chlorobenzene, halogen and trifluoromethyl being the only substituents on the benzene ring, and an alkali metal hydrocarbonoxide selected from the class consisting of alkoxides, cycloalkoxides, monocyclic aralkoxides, and monocyclic aryloxides in an anhydrous alcoholic medium at a temperature between about 40 and about 225 degrees centigrade and separating from the reaction product a hydrocarbonoxy(trifluoromethyl)benzene.

11. The process according to claim 2 wherein the (trifluoromethyl)benzene is a mono(trifluoromethyl)benzene and the hydrocarbonoxy(trifluoromethyl)benzene separated from the reaction product is a hydrocarbonoxymono(trifluoromethyl)benzene.

12. The process according to claim 2 wherein the alkali metal hydrocarbonoxide is represented by R—OX, wherein X is an alkali metal, and wherein the alcohol employed as reaction medium is represented by R—OH, R being the same hydrocarbon radical in both formulas.

13. The process according to claim 2 wherein the alkali metal hydrocarbonoxide is an alkali metal cycloalkoxide and the product separated is a cycloalkoxy(trifluoromethyl)benzene.

14. The process according to claim 2 wherein the alkali metal hydrocarbonoxide is an alkali metal alkoxide and the product separated is an alkoxy(trifluoromethyl)benzene.

15. The process according to claim 2 wherein the alkali metal hydrocarbonoxide is an alkali metal aryloxide and the product separated is an aryloxy(trifluoromethyl)benzene.

16. A compound of the formula $$CF_3-C_6H_4-O-isopropyl$$

17. 2-isopropoxy-1-(trifluoromethyl)benzene.

18. 4-isopropoxy-1-(trifluoromethyl)benzene.

19. A mono-lower-alkoxy-mono-(trifluoromethyl)benzene, wherein the alkoxy group contains at least two carbon atoms, the benzene ring being otherwise unsubstituted.

20. A mono-ethoxy-mono-(trifluoromethyl)-benzene.

21. 4-ethoxy-1-(trifluoromethyl)-benzene.

22. The method according to claim 1, wherein the (trifluoromethyl)-halobenzene is a monohalogenated (trifluoromethyl)-halobenzene and wherein the compound separated from the reaction product is a mono-hydrocarbonoxy-(trifluoromethyl)-benzene.

23. The method according to claim 1, wherein the (trifluoromethyl)-halobenzene is a mono-halogenated mono - (trifluoromethyl) - halobenzene, and wherein the compound separated from the reaction product is a mono-hydrocarbonoxy-mono-(trifluoromethyl)-benzene.

EARL T. McBEE.
ROBERT O. BOLT.
ROBERT TEBBE.

REFERENCES CITED

The following references are of record in the file of this patent:

UNITED STATES PATENTS

| Number | Name | Date |
|---|---|---|
| 2,257,093 | Friedrich et al. | Sept. 30, 1941 |

OTHER REFERENCES

Ser. No. 304,859, Petitcolas (A. P. C.), published June 15, 1943.